(12) United States Patent
Berenshteyn (10) Patent No.: US 6,317,808 B1
(45) Date of Patent: Nov. 13, 2001

(54) DATA STORAGE SYSTEM AND METHOD OF ROUTING OR ASSIGNING DISK WRITE REQUESTS AMONG A SET OF DISKS USING WEIGHTED AVAILABLE DISK SPACE VALUES

(75) Inventor: Yevgeniy Berenshteyn, Pleasanton, CA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/277,051

(22) Filed: Mar. 26, 1999

(51) Int. Cl.[7] ............................................. G06F 13/14
(52) U.S. Cl. ............................ 711/112; 711/114; 710/39
(58) Field of Search .................................. 711/112, 114, 711/170; 710/39

(56) References Cited

U.S. PATENT DOCUMENTS

| | | | |
|---|---|---|---|
| 4,200,928 | * 4/1980 | Allan et al. | 711/114 |
| 5,220,653 | * 6/1993 | Miro | 709/107 |
| 5,544,327 | * 8/1996 | Dan et al. | 709/234 |
| 5,546,550 | * 8/1996 | Carter | 710/129 |
| 5,687,390 | * 11/1997 | McMillan, Jr. | 710/5 |
| 5,787,482 | * 7/1998 | Chen et al. | 711/112 |
| 5,875,459 | * 2/1999 | Taoda | 711/114 |
| 5,926,649 | * 7/1999 | Ma et al. | 711/111 |
| 6,021,464 | * 2/2000 | Yao et al. | 711/113 |

* cited by examiner

*Primary Examiner*—Glenn Gossage
(74) *Attorney, Agent, or Firm*—Pennie & Edmonds LLP (57) ABSTRACT

A data storage system receives multiple data streams, such as a telephone messages, each of which are to be stored in a multidisk array. The data storage system generates a disk write request for each data stream. The disk write request is allocated to a disk in the multidisk array that has the highest weighted available space. The weighted available space of each disk is determined by the space availability of the disk and the load on the disk relative to other disks in the multidisk array. Optionally, the method used to allocate the disk space availability is dependent upon the disk write request load level. Thus, if the request load level is in a first load range, a least full assignment method is used, if the request load level is in a second range, a round robin method is used and if the request level is in a third range the weighted available space method is used.

21 Claims, 5 Drawing Sheets

DATA STORAGE SYSTEM AND METHOD OF ROUTING OR ASSIGNING DISK WRITE REQUESTS AMONG A SET OF DISKS USING WEIGHTED AVAILABLE DISK SPACE VALUES

The present invention relates generally to a system and method for routing requests for recording data in a data storage system such as a voice mail server.

BACKGROUND OF THE INVENTION

Data storage systems such as voice mail servers store and retrieve data such as phone messages for a large user base. This user base may consist of tens, hundreds or even thousands of users. Because they service a large user base, voice mail servers must be capable of simultaneously storing and retrieving multiple phone messages. The voice mail server stores each phone message in a set of disks known as a multidisk array. Users periodically retrieve these stored phone messages through a user interface. This user interface typically provides the user with several options for handling the stored messages such as reviewing, forwarding, deleting, or keeping stored messages. Typically, the voice mail server has the ability to store dozens of messages for each user. In addition, a voice mail server servicing hundreds or thousands of users may, during peak usage, be required to simultaneously store many dozens of voice mail messages.

Each stored phone message occupies a significant amount of disk storage space. Consequently, the voice mail server must have a correspondingly large data storage capability. This data storage capability is provided by the set of disks in the multidisk array. When a voice message requiring storage is received by the voice mail server, one of the disks in the multidisk array is selected, under a load balancing scheme, and the voice message is written to the selected disk. In order to balance the number of messages on each hard disk in the multidisk array, prior art load balancing schemes focused on selecting the disk in the multidisk array with the greatest amount of free disk space ("least full scheme") for recording incoming messages. However, this least full scheme presents problems in periods of high demand, in which a large number of requests to store phone messages are received over a short time interval and the load on the multidisk array is high. For example, if fifty voice messages are concurrently received by a voice mail server having a multidisk array containing twenty-five disks, each message would be routed to the disk having the most available disk space. Thus a queue length of forty-nine messages would develop as the second through fiftieth messages waited for access to the selected disk while the first message is written to the selected disk. A long queue of messages imposes an unacceptable delay on the voice mail server. Each queued message must be stored in random access memory (RAM) cache. As the example illustrates, a very long queue can quickly develop under a rigid least full scheme. This long queue may overflow the available RAM cache. As a result, the voice mail server may be forced to stop receiving messages during times of high demand. Such a situation is highly undesirable.

The least full scheme is particularly undesirable in situations in which a new disk has been added to the multidisk array. Because the new disk is empty, all disk write requests are routed to the new disk despite the fact that there are several other available disks that could be written to in a parallel fashion. As a result, the voice mail service experiences undesirable delay. If traffic on the voice mail server is high at the time the disk is added, the long queue of messages waiting to be stored on the new disk may result in the failure of the voice mail server to receive new incoming messages.

To circumvent the problems presented by a least full disk assignment scheme, some prior art systems exploit the ability of the multidisk array to write to several disks in a parallel manner. One way to use this parallel resource is to implement a round robin disk assignment scheme. Under a round robin approach, write requests are assigned to the disks in a fixed sequential order that repeats after every disk has been assigned a write request. For example, if a voice mail server having twenty-five disks concurrently receives fifty messages, the round robin disk assignment scheme will assign message 1 to disk 1, message 2 to disk 2, and so forth. When each of the twenty-five disks are assigned a message, the round robin approach will cycle back to the first disk. Thus, in the example, the $26^{th}$ message will be queued to disk 1, the $27^{th}$ message will be queued to disk 2 and so forth until all fifty messages are assigned to a disk.

As a result, a queue length of only one or two develops in the example. Although the round robin approach provides a shorter queue length than the least full scheme, the method is problematic because it does not provide a means for balancing the number of messages on each disk in the multidisk array in all possible scenarios. For example, if a $26^{th}$ disk is added to the existing 25 disks in the voice mail server described above, the round robin disk assignment scheme will assign the same number of incoming messages to the first twenty-five disks as it will the $26^{th}$ disk and the number of messages on the $26^{th}$ disk will therefore remain out of balance with respect to the original 25 disks for an extended period of time. If the reason for adding the $26^{th}$ disk is that the other disks were running out of room, the round robin assignment method is inconsistent with the reason for adding the new disk and may result in one or more disks actually being completely filled (a condition which should never occur).

In another example, if a large number of messages are deleted from a particular disk by users, the round robin approach will not compensate for the reduced number of messages on that disk relative to the other disks. The total load on the disk having fewer messages will be lighter than the other disks because it will be accessed, on average, fewer times by users retrieving stored messages. This disproportionate disk access may well result in data storage inefficiency that will pose further delay and an overloaded server.

Viewed from a different perspective, disks containing an excessive number of messages relative to other disks ("overloaded disks") in the multidisk array have a higher probability of being accessed by users who are retrieving stored messages. Thus the overloaded disks are, on average, in use more often then the remaining disks. The round robin approach does not compensate for this disproportionate usage. Consequently, under the round robin disk assignment scheme, the voice mail server may experience delays as incoming messages are assigned to disks that are servicing a large number of requests for stored messages. In periods of high demand, these delays will affect the speed with which messages are retrieved or stored.

Accordingly, it is an object of the present invention to provide a system and method for improving the way a data storage system, such as a voice mail server, selects a disk in a multidisk array to record incoming messages.

SUMMARY OF THE INVENTION

The present invention provides an improved method for identifying which disk, in a multidisk array of a data storage system, should be assigned a disk write request.

A data storage system having a multidisk array receives multiple streams of data, such as several concurrent voice messages, and generates a sequence of disk write requests for each stream of data. Each disk write request is assigned to the disk in the multidisk array having the highest weighted available space. The weighted available space of each disk in the multidisk array is the product of the space available on that disk and the weight assigned to that disk. This method of assigning disk write requests to disks is sometimes called the weighted available space method or procedure.

In a preferred embodiment, low weights are assigned to the disks most recently selected to perform data write tasks and higher weights are assigned to the disks least recently selected to perform data write tasks. When the disks have equal amounts of available space, the weighted available space method produces the same result as the round robin method. But when the disks have unequal amounts of space available, the weighted available space method assigns data write tasks to the disks with the most available space more often than the round robin method, but less often than the least full disk assignment method.

In another embodiment, the data storage system uses one of three different disk write request allocation procedures depending upon the current disk request load level ("load level"). When the system has a load level below a first load threshold, the least full assignment procedure is used to allocate write requests. When the load level is above a second load threshold, a round robin procedure is used to allocate the write request. When the load level is above the first load threshold and below the second load threshold, the weighted available space procedure is used to allocate the write request.

Individual weights that are assigned to each disk may be derived by any one of several methods. Preferably, the most recently used disk is assigned a weight of zero and all other disks are assigned a weight that is a function of how recently the disk has been allocated a write request.

The load level may also be defined by any one of several different methods. In one embodiment, the system load level is defined as the average number of write requests received per predefined unit of time in the past predefined number of such units of time. In another embodiment, the load level is defined as the number of open data streams in the system.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
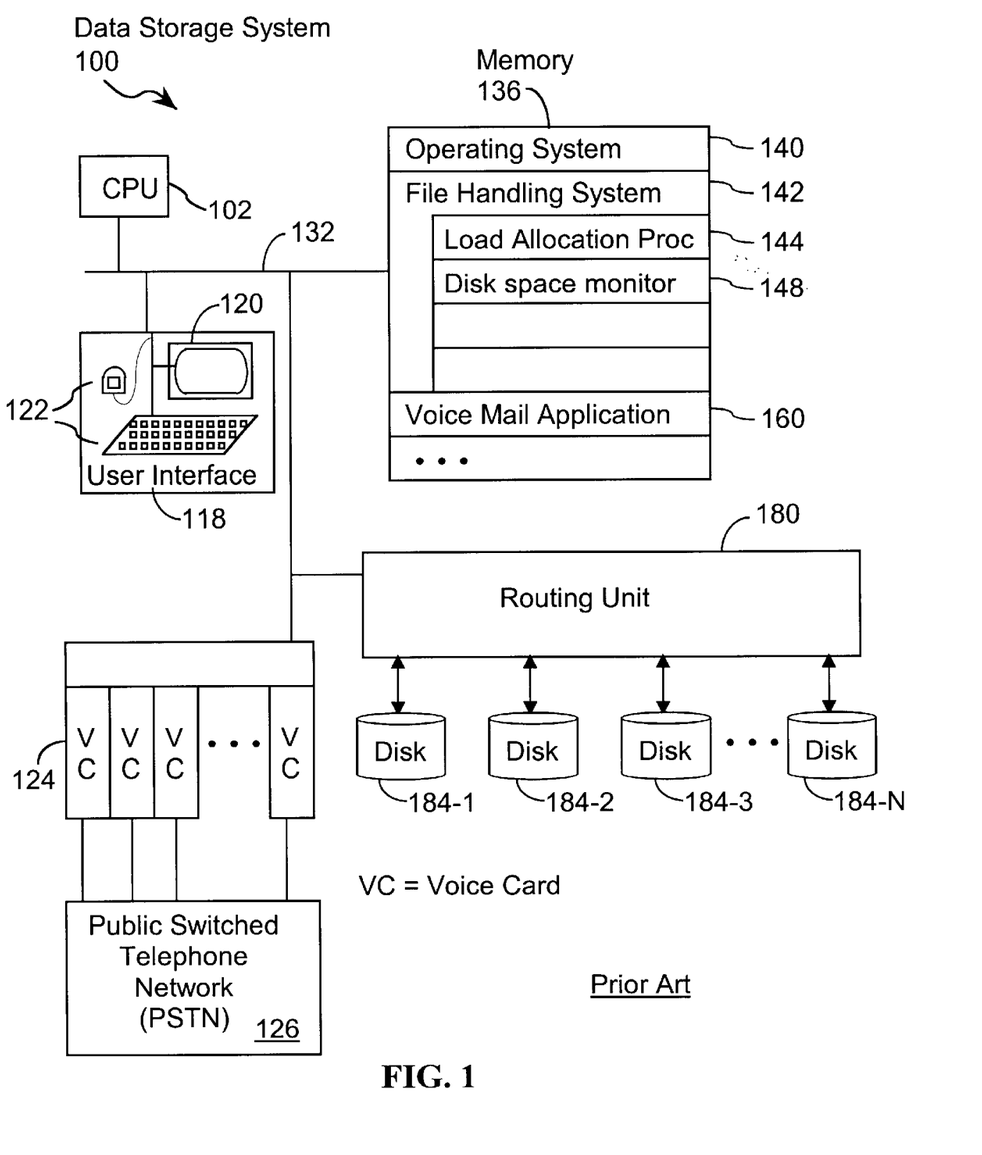
FIG. 1 is a block diagram of a prior art data storage system such as a voice mail server.

Referring to FIG. 1, there is shown a data storage system 100 such as a voice mail server for storing and retrieving messages. The system preferably includes:

a data processor or central processing unit (CPU) 102;

a user interface 118, including a display 120 and one or more input devices 122;

one or more voice cards 124 for receiving phone calls from a public service telephone network 126;

memory 136, which may include random access memory as well as disk storage and other storage media;

a routing unit 180 for routing incoming messages to one of a plurality of disks 184 (184-1 to 184-N) in accordance with load allocation procedure 144;

one or more buses 132 for interconnecting the aforementioned elements of the system.

The operation of system 100 is controlled primarily by control programs that are executed by the system's data processor or CPU 102. In a typical implementation, the programs stored in the system memory will include:

an operating system 140 that includes procedures for handling various basic system services and for performing hardware dependent tasks; the operating system may include a set of user interface procedures for handling input received from user interface 118 and displaying the output to the user on display 120;

a file handling system 142, including a load allocation procedure 144, for determining which disk 184 should be assigned a disk write request, and a disk space monitor 148, for determining the storage space available on each disk 184; and a voice mail application 160, for controlling the storage and retrieval of phone messages and the generation of disk write requests.

Referring to FIG. 1, voice cards 124 receive voice messages from a public service telephone network. For each incoming voice message, voice mail application 160 sends a sequence of disk write requests to load allocation procedure 144. For instance, a separate disk write request may be generated for each block of compressed, encoded voice data of a particular size. Load allocation procedure 144 assigns each disk write request to a particular disk 184 ("selected disk 184") by applying the least full assignment scheme to the disk space availability data provided by disk space monitor 148. Once a disk write request has been assigned to a selected disk 184, file handling system 142 sends a signal to routing unit 180 to store the data associated with the disk write request on the selected disk 184.

Figure 2:
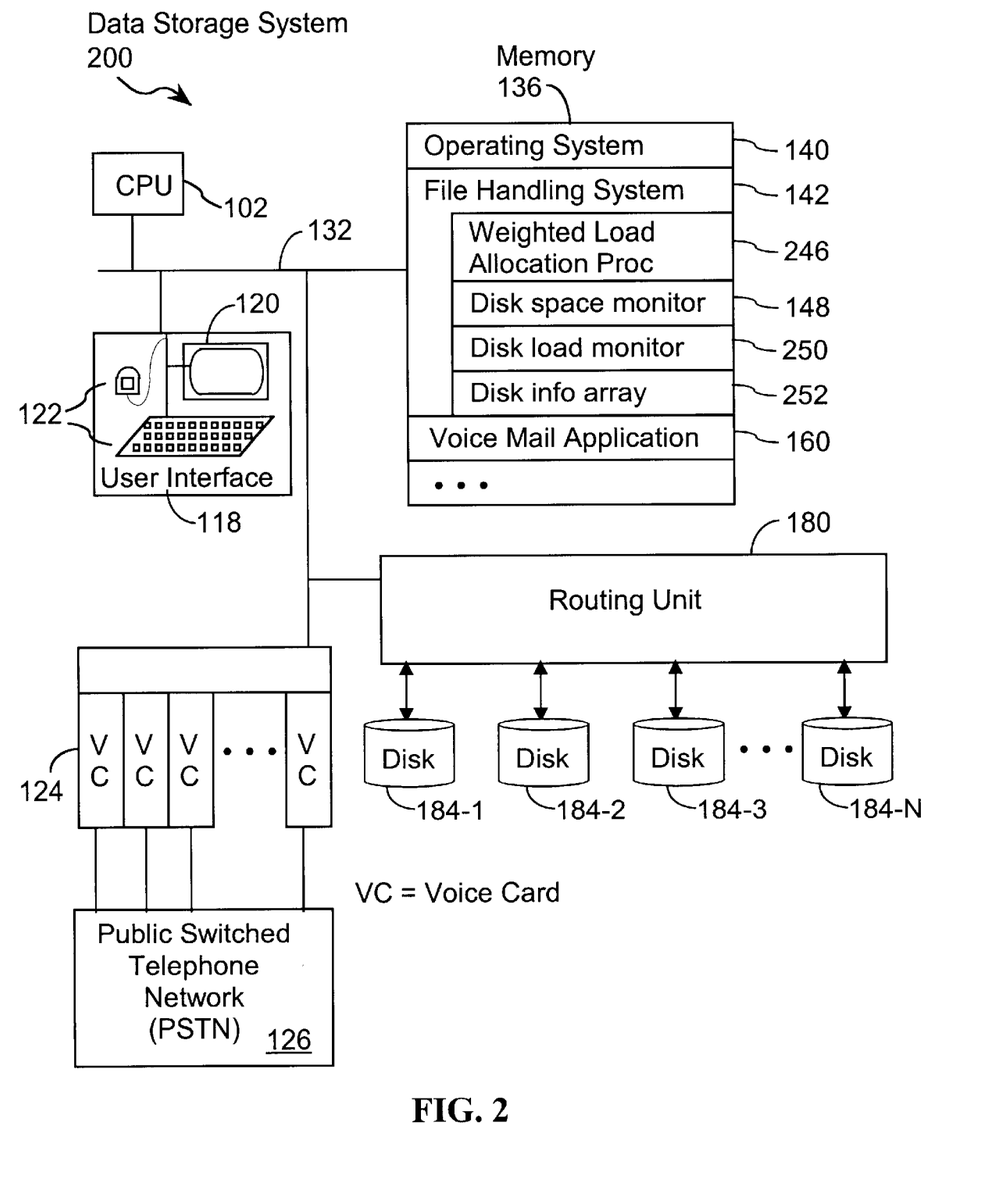
FIG. 2 is a block diagram of a data storage system such as a voice mail server in accordance with the present invention.

Referring to FIG. 2, there is shown an improved data storage system 200 such as a voice mail server for storing and retrieving messages. However, it should be understood that the present invention is applicable to other types of computer systems other than voice mail servers.

The system 200 includes all the elements of voice mail server 100, with the exception of load allocation procedure 144. Additionally, the system 200 includes:

disk load monitor 250, for determining the quantity of disk write requests being serviced by disks 184;

disk information array 252, for storing a weighted available space of each disk 184; and weighted load allocation procedure 246, for determining which disk 184 should be assigned a disk write request.

Voice mail application 160 sends disk write requests to weighted load allocation procedure 246. Weighted load allocation procedure 246 assigns each disk write request to a particular disk 184 ("selected disk 184") based upon a weighted available space disk assignment scheme. The weights used by weighted load allocation procedure 246 are stored in disk information array 252. These weights are determined by a function that takes into account disk space availability information provided by disk space monitor 148 as well as recent past assignments of disk write requests to each of the disks. Once a disk write request has been assigned to a particular disk 184, file handling system 142 sends a signal to routing unit 180 to store the corresponding block of data on selected disk 184. If several telephone messages are received concurrently, weighted load allocation procedure 246 will avoid selecting the same disk 184 to store each of the simultaneous messages.

Weighted Load Allocation Procedure

The operation of data storage system 200 will now be described with reference to FIGS. 3, 4 and 5.

Figure 3:
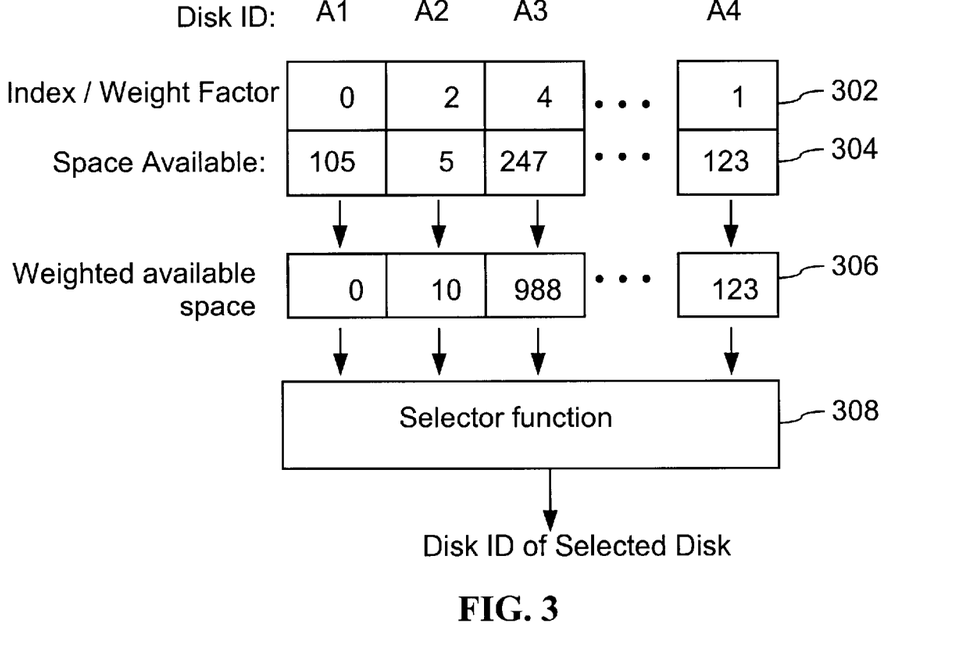
FIG. 3 is a block diagram depicting the relationship between disk load, disk space, a disk information array and a weighted load allocation procedure.

Referring to FIG. 3, in one embodiment, each disk in a multidisk array is assigned a weight factor 302. The weight factor of each disk is multiplied by the space available on the disk 304 to provide the weighted available space of the disk 306. The space available 304 on each disk may be represented as a number of units (e.g., megabytes) of disk storage available on the disk, or as a percentage of the disk's storage space that is available, or in any other suitable manner. A selector function 308 selects the disk in the multidisk array that has the highest weighted available space. As discussed in further detail below, there are a considerable number of ways in which weight factors may be assigned to each disk.

In a preferred embodiment, the most recently accessed disk is assigned a weight of 0, the second most recently accessed disk is assigned a weight of 1, and so forth. Equivalently, each disk $x_i$ in the set of disks is ranked by the number of disk write requests received since disk $x_i$ was last assigned a disk write request, and a weight is assigned to each disk $x_i$ based upon its current rank.

Because the individual weight of each disk is multiplied by the disk space available on that disk to yield the weighted available space of that disk, an empty disk will tend to have a high weighted available space value and therefore will be assigned the disk write request. However, if the empty disk receives such a request, it will be assigned a weight of 0. On the next write request, the empty disk will have a weighted available space of 0. Thus, the next disk write request will not be assigned to the empty disk. Because of the assignment of a weight of 0 to the most recently accessed disk, the empty disk will receive no more than 50% of all incoming write requests. Thus the data storage system will not incur delay due to an excessive queue on the new disk. Over time, the new disk will be filled with messages until the space available on the new disk is approximately equal with the space available on the other disks. The significance of the reduction in write requests queued to a new disk is particularly noticeable in situations where a new empty disk is added to a multidisk array during a period of high demand on the data storage system.

In another embodiment, weights are assigned to the disks according to the formula:

$$W_i = \alpha X_i + \beta$$

where $W_i$ is the weight assigned to the $i^{th}$ disk in the multidisk array, $X_i$ is the total number of disk write requests that have been received since disk i last received a write request, and $\alpha$ and $\beta$ are predefined, constant value coefficients. In embodiments according to this formula, it is possible that some disks will have the same weight as other disks in the multidisk array. However, recently accessed disks will generally be down weighted with respect to disks that have not been accessed recently. Preferably, $\alpha$ is equal to 1 and $\beta$ is equal to zero. In other embodiments, it is possible to assign other values to $\alpha$ and $\beta$.

In another preferred embodiment, weights are assigned according to the formula $W_i = Fcn(X_i)$, where $Fcn(X_i)$ is defined as a piecewise linear function. For instance, $Fcn(X_i)$, may defined as being equal to zero when $X_i$ is less than or equal to a first threshold number of disk write requests, a linearly increasing value when $X_i$ is between first and second threshold values, and a fixed value when $X_i$ is at or above the second threshold value.

In yet another embodiment, weights are assigned according to the formula:

$$W_i = Fcn(t_i)$$

where $W_i$ is the weight assigned to the $i^{th}$ disk in the multidisk array, and $Fcn(t_i)$ is a function of the time that has elapsed since disk i last received a write request ($t_i$). In one embodiment, $Fcn(t_i)$ is $Ct_i + D$, where C and D are predefined, constant value scaling constants. Thus, in this embodiment, $Fcn(t_i)$ is proportional to the amount of time that has elapsed since a disk write request was last assigned to the $i^{th}$ disk. Accordingly, disks that have recently been selected for disk write requests will be down-weighted with respect to disks that have not been assigned disk write request for a relatively long period of time.

In another preferred embodiment, $Fcn(t_i)$ is defined as a piecewise linear function. For instance, $Fcn(t_i)$ may defined as being equal to zero when $t_i$ is less than a first elapsed time threshold, a linearly increasing value when $t_i$ is between first and second time thresholds, and a fixed value when $t_i$ is at or above the second time threshold.

In other embodiments, the weights may be assigned based on a nonlinear monotonically increasing function of either $X_i$ or $t_i$, as defined above, or even a combination thereof.

Figure 4:
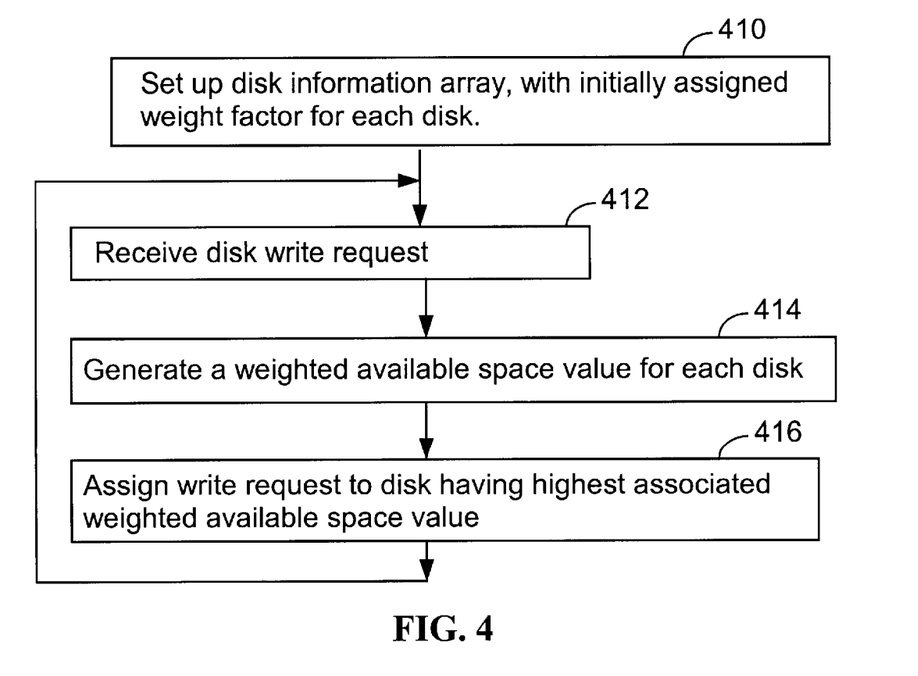
FIG. 4 is a flow chart of a method for assigning disk write requests among a set of disks according to one embodiment of the invention.

Referring to FIG. 4, in one embodiment of the invention, a disk information array is set up and each disk in the multidisk array is initially assigned a weight factor (step 410). When a disk write request is received (step 412), the weighted available space of each disk is generated (step 414). The disk write request is then assigned to the disk that has the highest weighted available space (step 416). Steps 412, 414 and 416 are repeated for each successive disk write request. Further, it should be noted that the order of steps 412, 414 and 416 could be different in other embodiments. For instance, step 414 could be performed before step 412.

Figure 5:
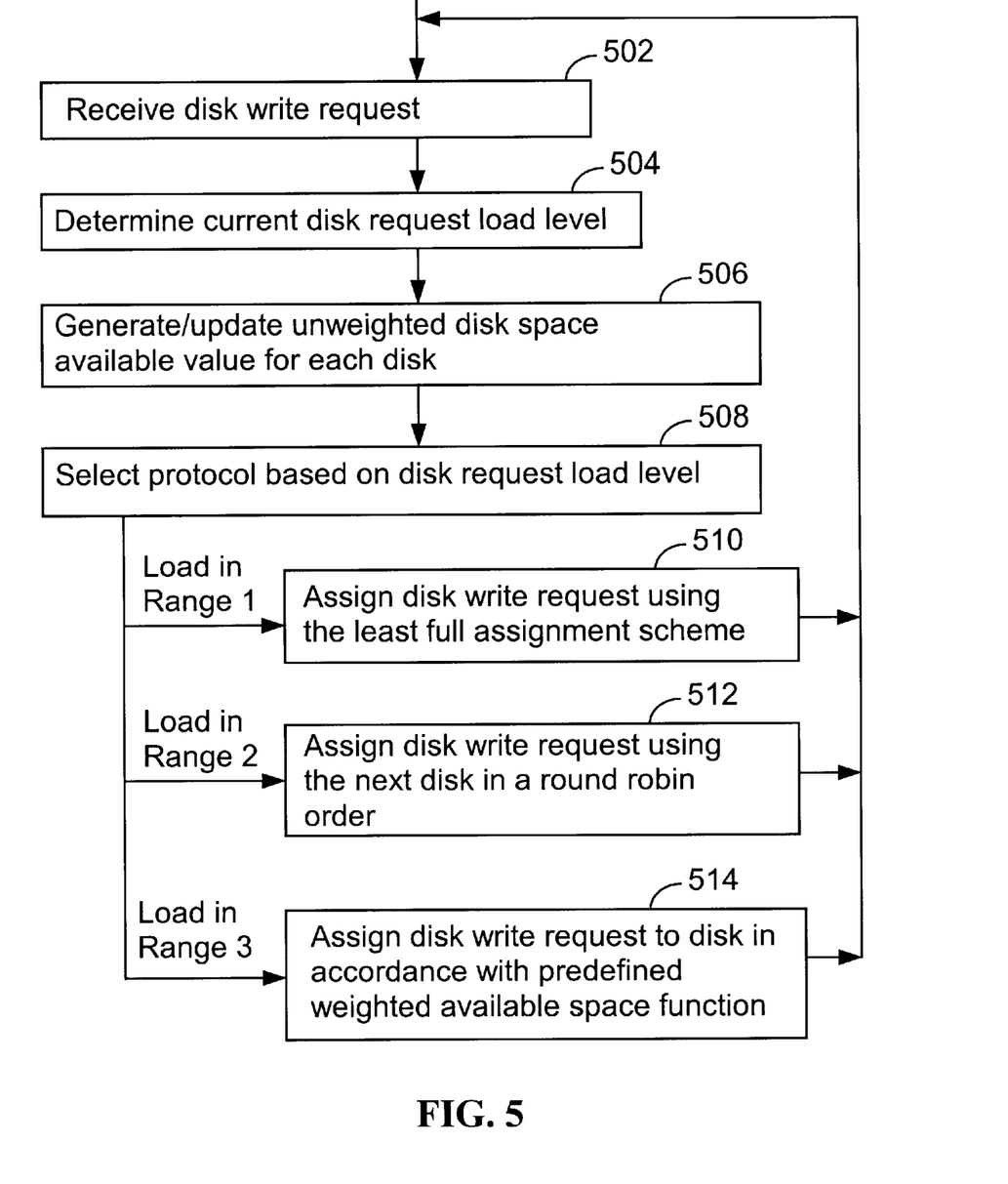
FIG. 5 is a flow chart of a method for assigning disk write requests among a set of disks according to another embodiment of the present invention.

Referring to FIG. 5, in another embodiment of the invention, a disk write request is received (step 502). The current disk request load level ("load level") is determined (step 504) and the unweighted disk available space value of each disk is updated (step 506). Then, one of three disk selection protocols (i.e., procedures) is chosen based upon the load level (step 508). Accordingly, when the load level is below a first load threshold (i.e., the load is in a first range), a disk is selected using a least full assignment scheme (step 510). When the load level is above a second load threshold (i.e., the load is in a second range), a disk is selected using a round robin order procedure (step 512). Finally, when the load level is above the first load threshold but below the second load threshold (i.e., the load is in a third range), a disk is selected in accordance with a predefined weighted available space function (step 514).

Figure 6:
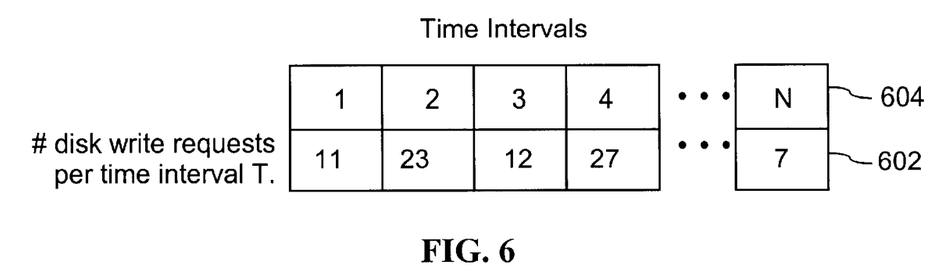
FIG. 6 is a block diagram showing how disk request load level is computed according to one embodiment of the invention.

The disk request load level ("load level") may be defined in any number of different ways. Referring to FIG. 6, in a preferred embodiment the load level is defined as the average number of disk write requests received per time interval T (602) over the last N number of such time intervals (604), where the values of T and N are predefined. Thus, in FIG. 6, if N is set equal to 5, the load level would be the average of the numbers 11, 23, 12, 27 and 7. In this example, the average will therefore be 16. In a second embodiment, the load level is defined as the number of open message sessions in the data storage system. In another embodiment, the load level is the number of disk write requests that have been queued to the multidisk array. In yet another embodiment, the load level is based on the average time that requests stay in a queue (i.e., the average length of time between receiving a request at the disk storage system and beginning to record the data associated with the request) for all requests received in the last K units of time.

When using the least full assignment method (step 510), the disk with the most available space is selected to receive the current disk write request. In contrast, the round robin disk assignment method (used in step 512) uses the disk available space value of each disk (step 506) to periodically update a list of all disks in the multidisk array having a minimum threshold available capacity. The round robin disk assignment method then allocates disk write requests in strict round robin order to the disks on the list and excludes disks that are not on the list. The weighted available space method (step 514) is only used when the least full and round robin methods are not used. In the weighted available space method, the weight for each disk in the multidisk array is first determined. In one embodiment, these weights correspond to a "most recently used" list that ranks the disks by the order in which the last N tasks have been assigned, where N is the number of disks to which disk write requests can be assigned. However, one skilled in the art will appreciate that any number of weighting schemes can be devised, including those discussed previously. The disk with the highest weighted available space value is assigned the current disk write request.

Referring again to FIG. 5, if the load level determined in step 504 remains above the first load threshold and below the second load threshold (i.e., the load is in the third range), the disk allocation method selection step 508 will always select the weighted available space method (used in step 514). Accordingly, allocation methods used in steps 510 and 512 will not be used. Thus, the way disk write requests are handled in the embodiment shown in FIG. 5 would reduce to an embodiment such as that shown in FIG. 4.

Figure 7:
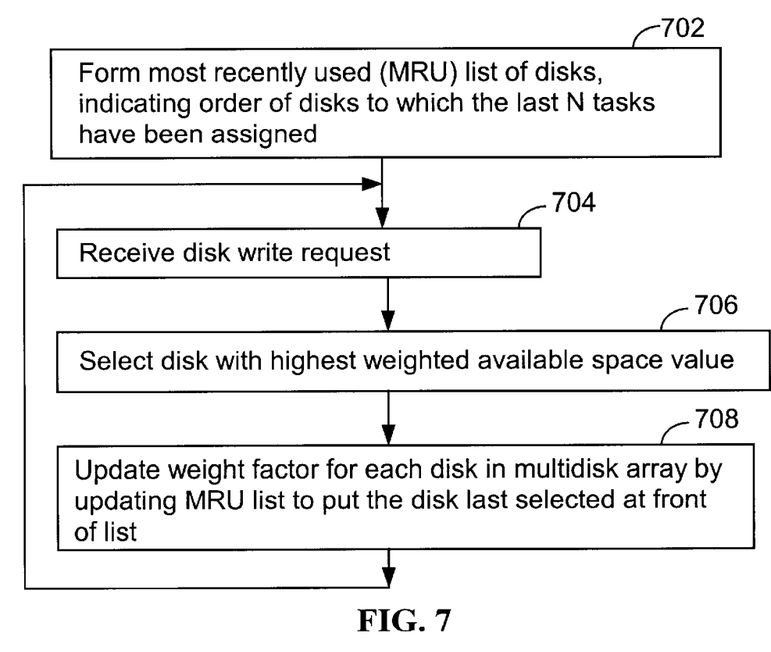
FIG. 7 is a flow chart of a method for assigning disk write requests among a set of disks according to one embodiment of the present invention when the disk request load level is above a first load threshold and below a second load threshold.

In a preferred embodiment, the sequence of steps that are taken in the case where the load level remains above the first load threshold and below the second load threshold (in the third range) is shown in FIG. 7. Referring to FIG. 7, a most recently used ("MRU") list is formed in initialization step 702. The weight assigned to each disk is the rank that the disk has on the MRU list. Thus, for example, the most recently used disk will be first on the MRU list and assigned a weight of 0. More generally, the $N^{th}$ most recently used disk will be ranked $N^{th}$ on the MRU list and assigned a weight of (N−1). If the MRU list is initialized at a time when there has been no recent disk usage, or the order of such disk usage is not known, then the available disks are assigned ranks on the MRU list either arbitrarily, or based on available space, or in accordance with any other suitable criteria.

Upon receipt of a disk write request (704), the disk that has the highest weighted available space value is selected (706). For each disk $x_i$ in the multidisk array, the weighted available space of $x_i$ is computed by multiplying the rank of disk $x_i$ on the MRU list, minus 1, by the unweighted space available on disk $x_i$. If a particular disk is not on the MRU list (e.g., because its available space is below a specified available space threshold), it does not receive a weighted available space value and will not be assigned a disk write request. Once a disk has been selected for a disk write request, the MRU list is updated in step 708 by placing the disk selected in 706 at the first position of the MRU list. The rank of all remaining disks on the MRU list are then adjusted accordingly. In one aspect, the invention provides that the space availability of each disk in the multidisk array is queried in step 708 and only disks having at least a minimum threshold capacity available are used to form the MRU list. For example, the minimum threshold capacity available may be set to 2% of the total capacity of the disk. After the MRU update in step 708, the system waits to receive a subsequent disk write request. Accordingly, steps 706 and 708 are repeated for each subsequent disk write request.

In some systems, large disk storage devices are divided into "virtual disks" for purposes of organizing the system's file handling system. Thus, when a disk write request is assigned to a particular physical disk, it is also assigned to one of the virtual disks on that physical disk. The assignment of a disk write request to a virtual disk on a selected physical disk is outside the scope of the present document.

Alternate Embodiments

The present invention can be implemented as a computer program product that includes a computer program mechanism embedded in a computer readable storage medium. For instance, the computer program product could contain the program modules shown in FIGS. 2–7 (e.g., the weighted load allocation procedure 246, the disk space monitor 148, the disk load monitor 250, and the procedures, shown in FIGS. 4, 5 and 7, for assigning disk write requests among a set of disks). These program modules may be stored on a compact disc read only memory (CD-ROM), magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of assigning a disk write request among a set of disks, comprising:

ranking each disk $x_i$ in the set of disks by a number of disk write requests received since disk $x_i$ was last assigned a disk write request;

assigning a weight factor to each disk $x_i$ based upon the rank of disk $x_i$;

storing for each disk in the set of disks a respective available space value that is determined by an available disk space in that disk;

receiving a disk write request;

generating a weighted available space value for each disk in accordance with a predefined function of the respective available space value and the weight factor for the disk; and assigning the disk write request to the disk having the highest associated weighted available space value.

2. The method of claim 1 wherein the Nth ranked disk is assigned a weight of (N−1).

3. A method of assigning a disk write request among a set of disks, comprising:

associating a weight factor with each disk in the set of disks wherein a weight factor of zero is associated with disks that fall below a minimum threshold capacity available;

storing for each disk in the set of disks a respective available space value that is determined by an available disk space in that disk;

receiving a disk write request;

generating a weighted available space value for each disk in accordance with a predefined function of the respective available space value and the weight factor for the disk; and assigning the disk write request to the disk having the highest associated weighted available space value.

4. A method of assigning a disk write request among a set of disks, comprising:

associating a weight factor with each disk in the set of disks wherein the weight factor associated with each disk is assigned according to the formula $W_i=\alpha X_i+\beta$, wherein $W_i$ is the weight factor assigned to the $i^{th}$ disk in the set of disks, $X_i$ is the total number of disk write requests that have been received since disk i last received a write request, and $\alpha$ and $\beta$ are predefined, constant value coefficients;

storing for each disk in the set of disks a respective available space value that is determined by an available disk space in that disk;

receiving a disk write request;

generating a weighted available space value for each disk in accordance with a predefined function of the respective available space value and the weight factor for the disk; and assigning the disk write request to the disk having the highest associated weighted available space value.

5. A method of assigning a disk write request among a set of disks, comprising:

associating a weight factor with each disk in the set of disks wherein the weight factor associated with each disk in the set of disks is assigned according to the formula:

$$W_i = Fcn(t_i)$$

wherein $W_i$ is the weight factor assigned to the $i^{th}$ disk in the set of disks, $t_i$ is an amount of time that has elapsed since disk i last received a write request, and $Fcn(t_i)$ is a function of the amount of time that has elapsed since disk i last received a write request;

storing for each disk in the set of disks a respective available space value that is determined by an available disk space in that disk;

receiving a disk write request;

generating a weighted available space value for each disk in accordance with a predefined function of the respective available space value and the weight factor for the disk; and assigning the disk write request to the disk having the highest associated weighted available space value.

6. The method of claim 5, further comprising:

after the assigning step, associating a new weight factor with each disk in the set of disks and then performing the receiving, generating and assigning steps for a next disk write request.

7. A method of assigning disk write requests to disks selected from a set of disks, comprising:

generating a disk request load value that corresponds to a quantity of disk write requests;

storing for each of the disks in the set of disks a respective available space value associated with available disk space in that disk;

selecting a first protocol for assigning disk write requests to disks in the set of disks when the disk request load value is below a first load threshold, the first protocol preferentially allocating disk write requests to disks solely in accordance with which disk in the set of disks has a highest respective available space value;

selecting a second protocol for assigning disk write requests to disks in the set of disks when the disk request load value is above a second load threshold, the second protocol allocating disk write requests to disks in round robin order; and selecting a third protocol for assigning disk write requests to disks in the set of disks when the disk request load value is between the first and second load thresholds, the third protocol allocating disk write requests to disks in accordance with a predefined weighted available space function.

8. The method of claim 7, wherein each disk in the set of disks that is below a minimum threshold capacity of available space is removed from the set of disks.

9. The method of claim 7, wherein each disk in the set of disks that is below a minimum threshold capacity of available space is given a weight of zero.

10. The method of claim 7 wherein the predefined weighted available space function further comprises:

determining an available space of each disk in the set of disks;

allocating a disk access rank to each disk x in the set of disks based upon a number of disk write requests that have been received since a disk write request was last queued to disk x;

associating a weighted available space with each disk in the set of disks by multiplying the available space by the disk access rank; and selecting the disk that has the highest weighted available space.

11. The method of claim 7, wherein the disk request load value is determined by an average number of requests received in a predetermined time interval over a predetermined number of such time intervals.

12. The method of claim 7, wherein the disk request load value is determined by a number of open message sessions that are being serviced by the set of disks.

13. The method of claim 7, wherein the disk request load is determined by a number of write requests that have been queued to the set of disks.

14. A data storage system, comprising:

a set of disks;

a control system for allocating disk write requests to a disk in the set of disks, the control system including:

a disk space monitor for determining storage space available on each of the disks in the set of disks and for storing, for each of the disks in the set of disks, a respective available space value associated with available disk space in that disk; and a request router that:

receives a disk write request;

associates a weight factor with each disk in the set of disks, wherein the weight factor associated with each disk is determined by ranking each disk $x_i$ in the set of disks by a number of disk write requests received since disk $x_i$ was last assigned a disk write request and associating a weight factor to each disk $x_i$ based upon the rank of disk $x_i$;

generates a weighted available space value for each disk in accordance with a predefined weighted available space function of (a) the available space on the disk and (b) the weight factor associated with the disk; and assigns the disk write request to the disk having the highest weighted available space value.

15. A data storage system, comprising:

a set of disks;

a control system for allocating disk write requests to a disk in the set of disks, the control system including:

a disk space monitor for determining storage space available on each of the disks in the set of disks and for storing, for each of the disks in the set of disks, a respective available space value associated with available disk space in that disk; and a request router that:

receives a disk write request;

associates a weight factor with each disk in the set of disks, wherein the request router ranks each disk x in the set of disks based upon a number of disk write requests that have been generated by the data storage system since a disk write request was last queued to disk $x_i$ and associates a weight with each disk $x_i$ based upon the rank of disk $x_i$;

generates a weighted available space value for each disk in accordance with a predefined weighted available space function of (a) the available space on the disk and (b) the weight factor associated with the disk; and assigns the disk write request to the disk having the highest weighted available space value.

16. A data storage system, comprising;

a set of disks;

a control system for allocating disk write requests to a disk in the set of disks, the control system including:

a disk usage load monitor for generating a disk request load value that corresponds to a quantity of disk write requests being serviced by the set of disks; and a request router that:

receives a disk write request;

assigns the disk write request according to a first protocol if the disk request load value is below a first load threshold, wherein the first protocol comprises assigning the disk write request in accordance with which disk in the set of disks has a highest respective available space value;

assigns the disk write request according to a second protocol if the disk request load is above a second load threshold, wherein the second protocol comprises assigning the disk write request in round robin order; and assigns the disk write request according to a third protocol if the disk request load is above a first load threshold and below a second load threshold, wherein the third protocol comprises allocating the disk write request in accordance with a predefined weighted available space function.

17. A computer program product for use in conjunction with a computer system having a set of disks, the computer program product comprising a computer readable storage medium and a computer program mechanism embedded therein, the computer program mechanism comprising:

a disk space monitoring module for determining an available space value for each of the disks in the set of disks and for storing for each of the disks in the set of disks a respective available space value that is determined by an available disk space in that disk; and a request router module including instructions for:

receiving a disk write request;

ranking each disk $x_i$ in the set of disks by a number of disk write requests received since disk $x_i$ was last assigned a disk write request;

assigning a weight factor to each disk $x_i$ based upon the rank of disk $x_i$;

generating a weighted available space value for each disk in accordance with a predefined function of (a) the available space value and (b) the weight factor for the disk; and assigning the disk write request to the disk in the set of disks having the highest associated weighted available disk value.

18. A computer program product for use in conjunction with a computer system having a set of disks, the computer program product comprising a computer readable storage medium and a computer program mechanism embedded therein, the computer program mechanism comprising:

a disk space monitoring module for determining an available space value for each of the disks in the set of disks and for storing for each of the disks in the set of disks a respective available space value that is determined by an available disk space in that disk; and a request router module including instructions for:

receiving a disk write request;

ranking each disk x in the set of disks based upon a number of disk write requests that have been generated by the data storage system since a disk write request was last queued to disk $x_i$;

assigning a weight factor to each disk $x_i$ based upon the rank of disk $x_i$;

generating a weighted available space value for each disk in accordance with a predefined function of (a) the available space value and (b) the weight factor for the disk; and assigning the disk write request to the disk in the set of disks having the highest associated weighted available disk value.

19. The computer program product of claim 18, wherein a weight factor of zero is assigned to disks that fall below a minimum threshold capacity available.

20. A computer program product for use in conjunction with a computer system having a set of disks, the computer program product comprising a computer readable storage medium and a computer program mechanism embedded therein, the computer program mechanism comprising:

a disk space monitoring module for determining an available space value for each of the disks in the set of disks and for storing for each of the disks in the set of disks a respective available space value that is determined by an available disk space in that disk; and a request router module including instructions for:
receiving a disk write request,
assigning a weight factor to each disk in the set of disks;
generating a weighted available space value for each disk in accordance with a predefined function of (a) the available space value and (b) the weight factor for the disk; and
assigning the disk write request to the disk in the set of disks having the highest associated weighted available disk value;
wherein each disk is assigned a weight factor according to the formula $W_i = \alpha X_i + \beta$, wherein $W_i$ is the weight factor assigned to the ith disk in the set of disks, $X_i$ is the total number of disk write requests that have been received since disk i last received a write request, and $\alpha$ and $\beta$ are predefined, constant value coefficients.

21. A computer program product for use in conjunction with a computer system having a set of disks, the computer program product comprising a computer readable storage medium and a computer program mechanism embedded therein, the computer program mechanism comprising:

a disk space monitoring module for determining an available space value for each of the disks in the set of disks and for storing for each of the disks in the set of disks a respective available space value that is determined by an available disk space in that disk; and a request router module including instructions for:
receiving a disk write request,
assigning a weight factor to each disk in the set of disks;
generating a weighted available space value for each disk in accordance with a predefined function of (a) the available space value and (b) the weight factor for the disk; and
assigning the disk write request to the disk in the set of disks having the highest associated weighted available disk value;
wherein the weight factor assigned to each disk in the set of disks is assigned according to the formula:

$$W_i = Fcn(t_i)$$

wherein $W_i$ is the weight factor assigned to the $i^{th}$ disk in the set of disks, $t_i$ is an amount of time that has elapsed since disk i last received a write request, and $Fcn(t_i)$ is a function of the amount of time that has elapsed since disk i last received a write request.

* * * * *